US008350701B2

(12) United States Patent
Carrender et al.

(10) Patent No.: US 8,350,701 B2
(45) **Date of Patent: *Jan. 8, 2013**

(54) MULTISTATIC ANTENNA CONFIGURATION FOR RADIO FREQUENCY IDENTIFICATION (RFID) SYSTEMS

(75) Inventors: Curtis L. Carrender, Morgan Hill, CA (US); John Michael Price, Morgan Hill, CA (US)

(73) Assignee: Alien Technology Corporation, Morgan Hill, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/475,166

(22) Filed: May 29, 2009

(65) Prior Publication Data

US 2009/0231105 A1 Sep. 17, 2009

Related U.S. Application Data

(63) Continuation of application No. 11/828,322, filed on Jul. 25, 2007, now Pat. No. 7,554,451, which is a continuation of application No. 11/070,477, filed on Mar. 1, 2005, now Pat. No. 7,265,675.

(51) Int. Cl.
*G08B 13/14* (2006.01)

(52) U.S. Cl. ...................... 340/572.7; 340/8.1; 340/10.1

(58) Field of Classification Search ............... 340/572.4, 340/572.7, 10.1, 825.49, 8.1
See application file for complete search history.

(56) References Cited

U.S. PATENT DOCUMENTS 5,914,671 A * 6/1999 Tuttle ......................... 340/10.42
5,995,046 A 11/1999 Belcher et al.
6,512,478 B1 1/2003 Chien
6,812,824 B1 11/2004 Goldinger et al.
7,119,738 B2 10/2006 Bridgelall et al.
2002/0175805 A9 11/2002 Armstrong et al.
2002/0181565 A1 12/2002 Boyd et al.
2003/0013146 A1 1/2003 Werb
2005/0143133 A1 6/2005 Bridgelall
2005/0200456 A1 9/2005 Bridgelall
2006/0044147 A1 * 3/2006 Knox et al. ................ 340/572.1

OTHER PUBLICATIONS

J. Grubert, et al. "Planar Millimeter Wave Radar Frontend for Automotive Applications". Advances in Radio Science, 2003, 1: 125-129.

Wikipedia, the Free Encyclopedia. http://en.wikipedia.org/wiki/Multistatic_radar. Dec. 2004.

* cited by examiner

*Primary Examiner* — Thomas Mullen
(74) *Attorney, Agent, or Firm* — Blakely, Sokoloff, Taylor & Zafman LLP

(57) ABSTRACT

Methods and apparatuses for configuring antennae of radio frequency identification reader systems. In one aspect of an embodiment, a radio frequency identification (RFID) reader system, includes: a receiver; a radio frequency (RF) source for signal transmission; and a switch matrix coupled with the receiver and the radio frequency source to selectively couple the receiver and the radio frequency source to a plurality of non-collocated antennae. When in a first mode, the switch matrix connects the radio frequency source to a first one of the antennae for signal transmission and the receiver to a second one of the antennae for signal reception; and when in a second mode, the switch matrix connects the first one of the antennae for signal reception and, in one example, the second one or another one of the antennae to the RF source for signal transmission.

6 Claims, 13 Drawing Sheets

MULTISTATIC ANTENNA CONFIGURATION FOR RADIO FREQUENCY IDENTIFICATION (RFID) SYSTEMS

This application is a continuation application of U.S. application Ser. No. 11/828,322 filed Jul. 25, 2007, now issued as U.S. Pat. No. 7,554,451, which is a continuation of application Ser. No. 11/070,477, filed Mar. 1, 2005, now issued as U.S. Pat. No. 7,265,675 B1, entitled "Multistatic Antenna Configuration for Radio Frequency Identification (RFID) Systems."

TECHNOLOGY FIELD

At least some embodiments of the present invention relate to radio frequency identification (RFID), and more particular to antenna configurations for radio frequency identification reader systems.

BACKGROUND

Multiple wireless tags can be interrogated through sending from an interrogating transmitter (e.g., a reader) a code and having information transmitted by the tag in response. The interrogation is commonly accomplished through arranging the tags to listen for an interrogation message and to respond with a unique serial number and/or other information.

The tags typically have limited power available for transmitting data wirelessly to the reader. For example, in a reader-powered backscatter mode, the tags operate using the power of the received signal from the reader to transmit. In general, the tags may or may not have their own power source. It is generally desirable to extend the range of wireless tags so that it is not necessary to bring each tag close to a reader for reading. A reader is typically designed to have a high transmission power and high sensitivity to backscattered signals from the tags.

Traditional radio frequency identification (RFID) systems are typically bistatic systems or monostatic systems.

A bistatic system uses different antennae for transmission and reception. The antennae in a bistatic system are sufficiently separated in space to have fewer isolation problems. As transmit and receive are separate in space, an amplifier can be used on the receive side of the reader to improve sensitivity.

However, since a bistatic system uses distinct and separate receive and transmit antennae, a typical bistatic system has a large size and a high price. A typical antenna of an RFID reader system costs about $150 to $250. Thus, using distinct and separate receive and transmit antennae can lead to a high cost system.

A monostatic system uses the same antenna, or collocated antennae, for transmission and reception. When the same antenna is used for both transmission and reception, a monostatic system may use only half of the number of antennae that is used in a bistatic system and cover the same area. However, a monostatic system typically requires lots of tuning to isolate the transmit power and the receiver. In a typical RFID system, the transmit power of a reader may be around a Watt or two, while the receiver may be expected to be sensitive to signals at microwatt levels. Thus, it is difficult to implement a low noise amplifier (LNA) or a low noise receiver in a monostatic system. Since receive and transmit are at the same location, the spill over and cross talk can present a big challenge in the design of a monostatic system.

Conventional RFID readers are typically designed to use one of three general approaches to transmit signals to and receive signals from one or more tags, including a single-channel homodyne technique, a two-antenna bistatic technique, and a technique to use a circulator device.

FIG. 1A shows one standard approach for an RFID reader to read a beam-powered tag in which a homodyne receiver is used. The term "homodyne receiver" refers to the fact that there is but a single channel for both the transmitted signal and the received signal and a direct down conversion of the data to baseband. With the advantage of simplicity, a homodyne receiver is quite common. However, a homodyne receiver has the disadvantage of creating noise and lower sensitivity if not perfectly tuned.

In the example of FIG. 1A, the reader module (101) has a single antenna 107 coupled to both a radio frequency (RF) source (103) and a receiver (105). Using the signal from the frequency source (103), the receiver (105) directly down converts the data received from the antenna (107).

FIG. 1B shows an approach of a bi-static design where separate antennae are used for transmit and receive. For example, a reader module (121) in FIG. 1B has a radio frequency source (123) coupled to its own antenna (127) to transmit signals and a receiver (125) coupled to its own antenna (129) to receive signals. One disadvantage of a bistatic design is the added cost of two antennae instead of one. Since microwave antennae of some gain are expensive, and since the coax cable used at these frequencies can be expensive, the added cost of an additional antenna can be a major problem.

FIG. 1C shows a conventional technique to have a circulator in the reader to separate the incoming signal (to receive) from the outgoing signal (to transmit). A circulator couples the powers in a preferred direction so that the receiver retains backscatter information and the transmitter powers the tag. For example, the reader module (111) in FIG. 1C has a circulator (119) which couples power in a preferred direction, forward for transmit and power, and to the receiver for the receive or reflected portion. Power to the tag passes through to the antenna (117) and received power from the tag is channeled toward the receiver block after being reflected by the tag. In FIG. 1C, the circulator (119) couples port 2 to port 1 to transmit signals and couples port 2 to port 3 to receive signals. The use of a circulator in a monostatic design is also quite common but has the disadvantage of requiring a circulator that is an expensive device.

In a multistatic radar system, the transmitter and receiver antennae are positioned in different locations. The system is not confined to one receiver. Several receiver systems may be operated with one common transmitter. Alternatively, several transmit antennas can be used for transmit position or polarization diversity.

SUMMARY OF THE DESCRIPTION

Methods and apparatuses for configuring antennae of radio frequency identification reader systems are described here. Some of the embodiments of the present invention are summarized in this section.

In one aspect of an embodiment, a radio frequency identification (RFID) reader system, includes: a receiver; a radio frequency (RF) source for signal transmission; and a switch matrix coupled with the receiver and the radio frequency sources to selectively couple the receiver and the radio frequency source to a plurality of non-collocated antennae. When in a first mode, the switch matrix connects the radio frequency source to a first one of the antennae for signal transmission and the receiver to a second one of the antennae for signal reception; and when in a second mode, the switch matrix connects the first one of the antennae for signal reception and, in one example, the second one or another one of the antennae for signal transmission.

In one example of an embodiment according to this aspect, the radio frequency identification reader system further includes the plurality of antennae.

In one example of an embodiment according to this aspect, when in the second mode, the switch matrix connects the receiver to the first one of the antennae for signal reception. In one example, when in the second mode, the switch matrix connects the second one of the antennae to the radio frequency source for signal transmission. In another example, when in the second mode, the switch matrix connects a third one of the antennae to the radio frequency source for signal transmission.

In one example of an embodiment according to this aspect, the radio frequency identification reader system further includes a low noise amplifier (LNA) coupled with the switch matrix. In one example, when in the first mode, the switch matrix connects the low noise amplifier to the second one of the antennae for signal reception; and when in the second mode, the switch matrix connects the low noise amplifier to the first one of the antennae for signal reception.

In one example of an embodiment according to this aspect, when in the second mode: the switch matrix connects a third one of the antennae for signal transmission, and the first one of the antennae is not connected to a radio frequency (RF) source of the reader system.

In one example of an embodiment according to this aspect, the radio frequency identification reader system further includes: a timing circuit coupled with the radio frequency source. The timing circuit is to determine a signal propagation delay between the first and second ones of the antennae via a radio frequency identification tag. In one example, the radio frequency identification reader system further includes a processor coupled to the timing circuit. The processor is to determine location information of the radio frequency identification tag using at least the signal propagation delay.

In one example of an embodiment according to this aspect, the radio frequency identification reader system further includes: a phase comparison circuit to compare relative phases of backscatter received from multiple of the non-collocated antennae. In one example, the radio frequency identification reader system further includes a processor coupled to the phase comparison circuit. The processor is to determine distance or location information of the radio frequency identification tag using phase differences determined from the relative phases seen at multiple of the non-collocated antennae.

In one example of an embodiment according to this aspect, the radio frequency identification reader system further includes: a signal modulator coupled with the switch matrix. The signal modulator is to generate a modulated signal to emulate a radio frequency identification tag. When in the first mode, the switch matrix connects a third one of the antennae to the modulated signal for signal transmission.

In one example of an embodiment according to this aspect, when in the first mode, the switch matrix connects a fourth one of the antennae to receive signals reflected from the first one of the antennae; and the signal modulator generates the modulated signal according to the signals received from the fourth one of the antennae. These antennae can be within one reader where, as an example, antenna number 1 emulates a tag and antenna 2 is the transmit antenna and antenna 3 is the receive antenna. These antennae can also be across two systems where reader A uses one antenna to act as and emulate a tag and reader B reads this tag in any manner.

In one example of an embodiment according to this aspect, the radio frequency identification reader system further includes: a logic circuitry coupled to the switch matrix. The logic circuitry is to control switching activity of the switch matrix to generate a modulated backscatter signal.

In one aspect of an embodiment, a method to operate a radio frequency identification (RFID) reader system includes: switching connectivity to a plurality of non-collocated antennae for operation in a first configuration; and switching connectivity to a plurality of antennae for operation in a second configuration. In the first configuration, a first one of the antennae is to be connected to a radio frequency source for signal transmission to radio frequency identification tags; and a second one of the antennae is to be disconnected from a radio frequency source and reconnected to a receiver for signal reception from radio frequency identification tags in the first configuration. In the second configuration, the first one of the antennae is to be disconnected from a radio frequency source and reconnected for signal reception of the radio frequency identification tags; and the second one (or another one, or more) of the antennae is to be connected to the RF source for transmission to the radio frequency identification tags.

In one example of an embodiment according to this aspect, in the second configuration a third one of the antennae is to be connected to a radio frequency source for signal transmission to radio frequency identification tags.

In one example of an embodiment according to this aspect, the method further includes: determining signal propagation delay on a path from the first one of the antennae to a radio frequency identification tag and then to the second one of the antennae; and determining a location of the radio frequency identification tag using the signal propagation delay.

In one example, signal propagation delays via the radio frequency identification tag between the first one of the antennae and each of the antennae except the first one are used in determining the location of the radio frequency. In another example, signal propagation delays via the radio frequency identification tag between a selected pairs of the antennae are used to determine the location of the radio frequency.

In one example, the method further includes: determining a position of the tag from phase information contained in the backscatter signal from the tag by determining differences between the phase information.

In one example, in the first configuration a third one of the antennae is to be connected to a radio frequency source for transmission of a first signal emulating a backscattered signal from a radio frequency identification tag. The method further includes: determining whether or not the first signal is properly received at the second one of the antennae in the first configuration.

In one example, in the first configuration a third one of the antennae is to be connected to an impedance modulator for reflection of a first signal emulating a backscattered signal from a radio frequency identification tag.

In one example, in the second configuration the first one of the antennae is to reflect a first signal emulating a backscattered signal from a radio frequency identification tag; and the method further includes: determining whether or not the first signal is properly received at the second one of the antennae in the first configuration. In one example, a first reader comprises the first one of the antennae; and the first signal is from a second reader which is different from the first reader. In one example, one reader talks to another by emulating a tag. Emulating a tag is not limited to one reader doing a self test by having one of it's antennae act as a tag. In one example, a reader emulates a tag or uses a “tag like” backscatter link to communicate with another reader.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

In one embodiment of the present invention, normally unused antennae are used to act as receiver antennae and multiplex the transmit and receive functions in time. Individual antennae are capable of being switched for transmit and receive. Separate, non-collocated antennae are used together or alone to read radio frequency identification tags in a way similar to a bistatic system, without dedicated transmit antennae and receive antennae.

For example, in a multi-antenna system where each antenna looks like a monostatic design that is capable of transmit and receive, the transmission and reception functions of each antenna are activated only one at a time to avoid spill over and cross talk, not at the same time. Antennae at different locations are switched into a pair of transmission and reception antennae to operate in a way similar to a bistatic design. Alternatively, each of the antennae can be further switched to operate in a monostatic mode.

In one embodiment, a switch matrix is used to switch the antenna system into different configurations. An antenna is switched to transmit in one or some configurations and to receive without transmitting in other configurations. Optionally, in further configurations, an antenna is switched into a monostatic mode to both transmit and receive.

Figure 2:
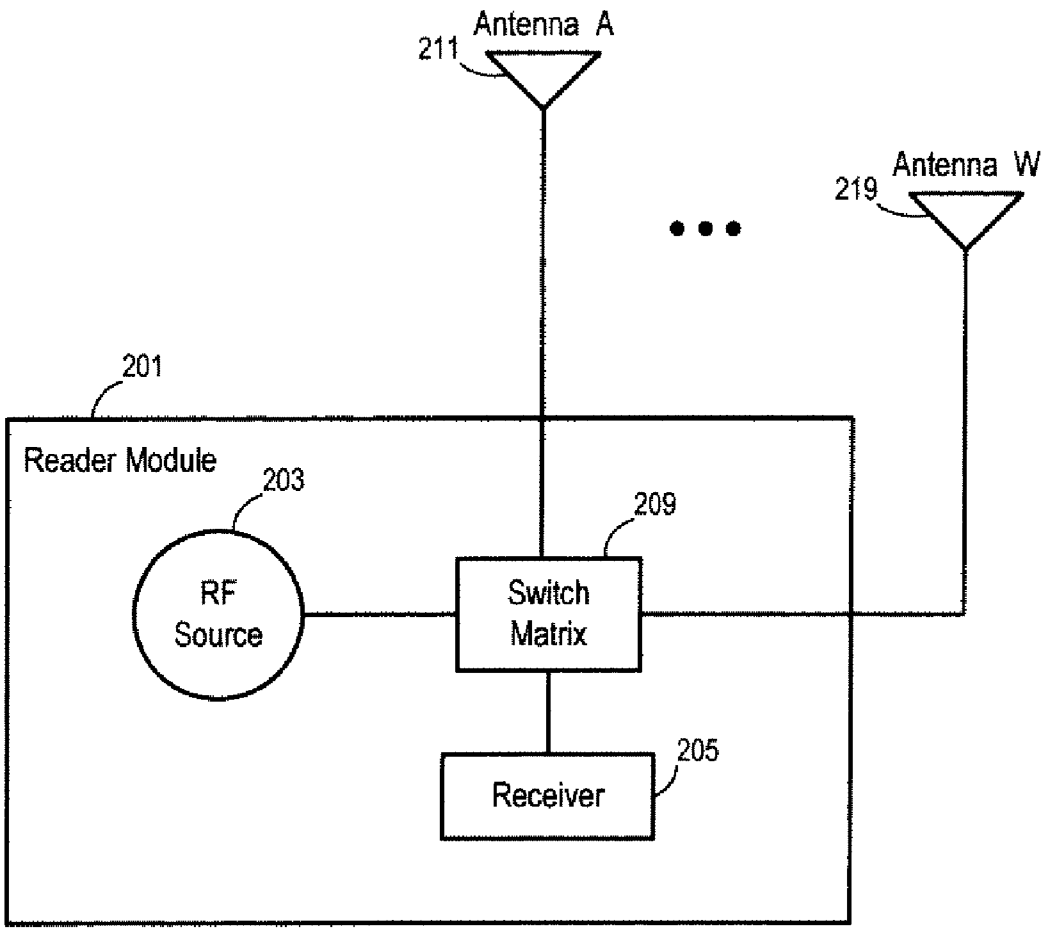
FIG. 2 illustrates an RFID reader module according to one embodiment of the present invention.

FIG. 2 illustrates an RFID reader module according to one embodiment of the present invention.

Figure 1A:
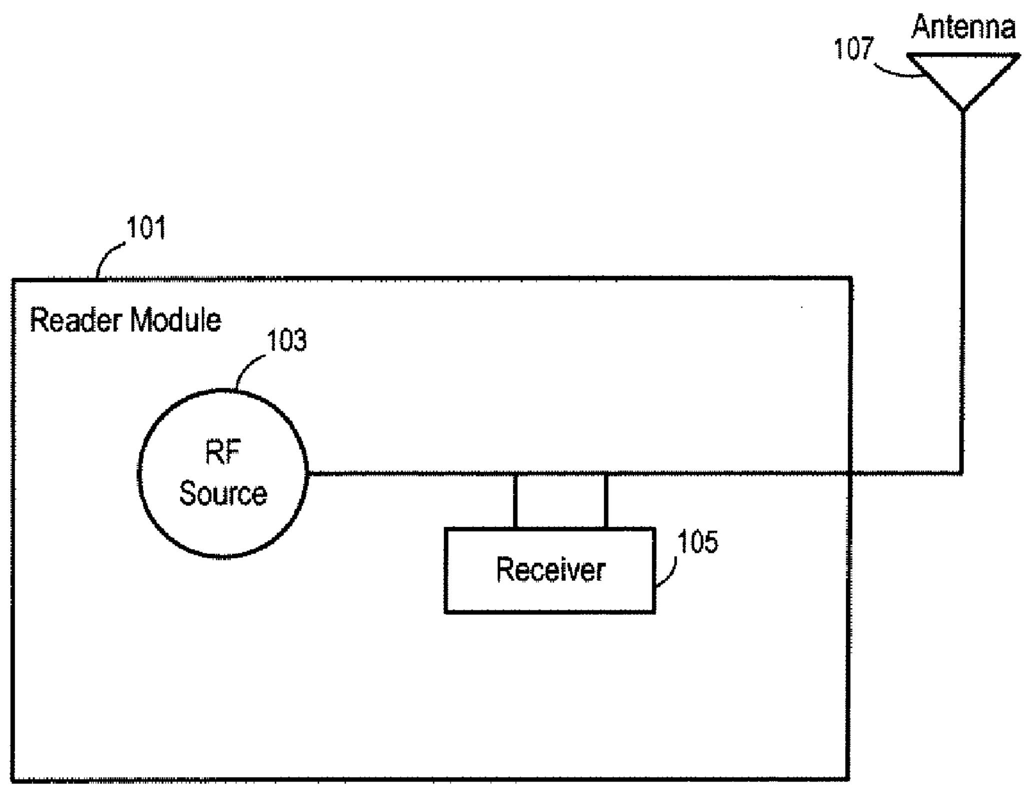
FIGS. 1A-1C illustrate examples of traditional RFID reader modules.
Figure 1B:
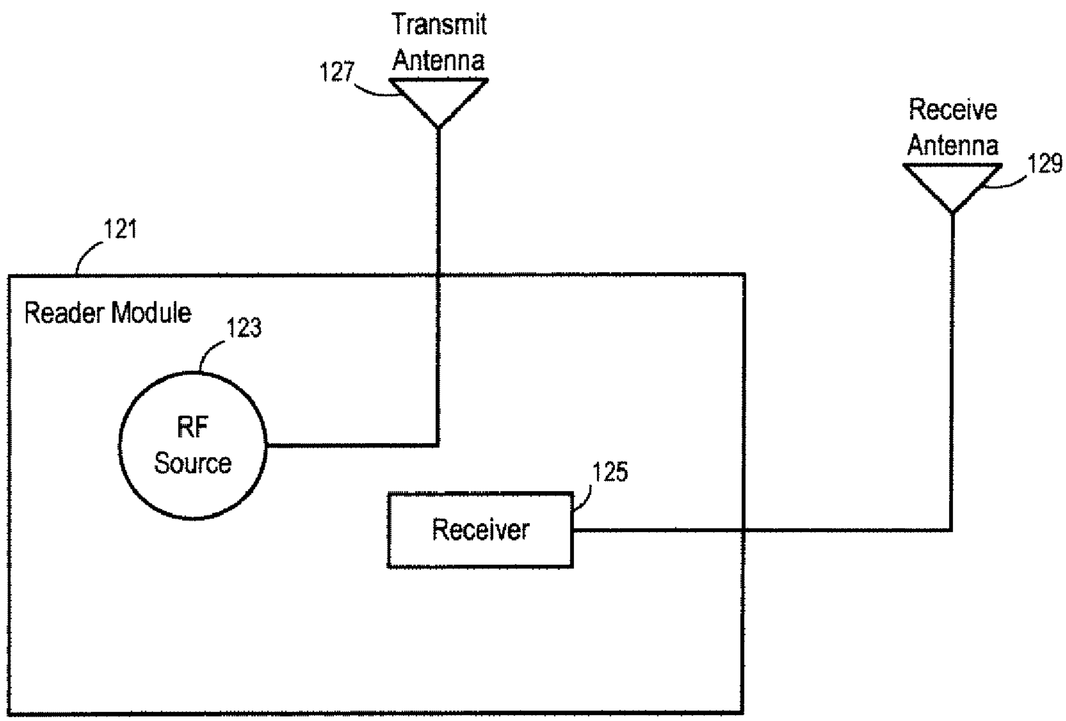
Figure 1C:
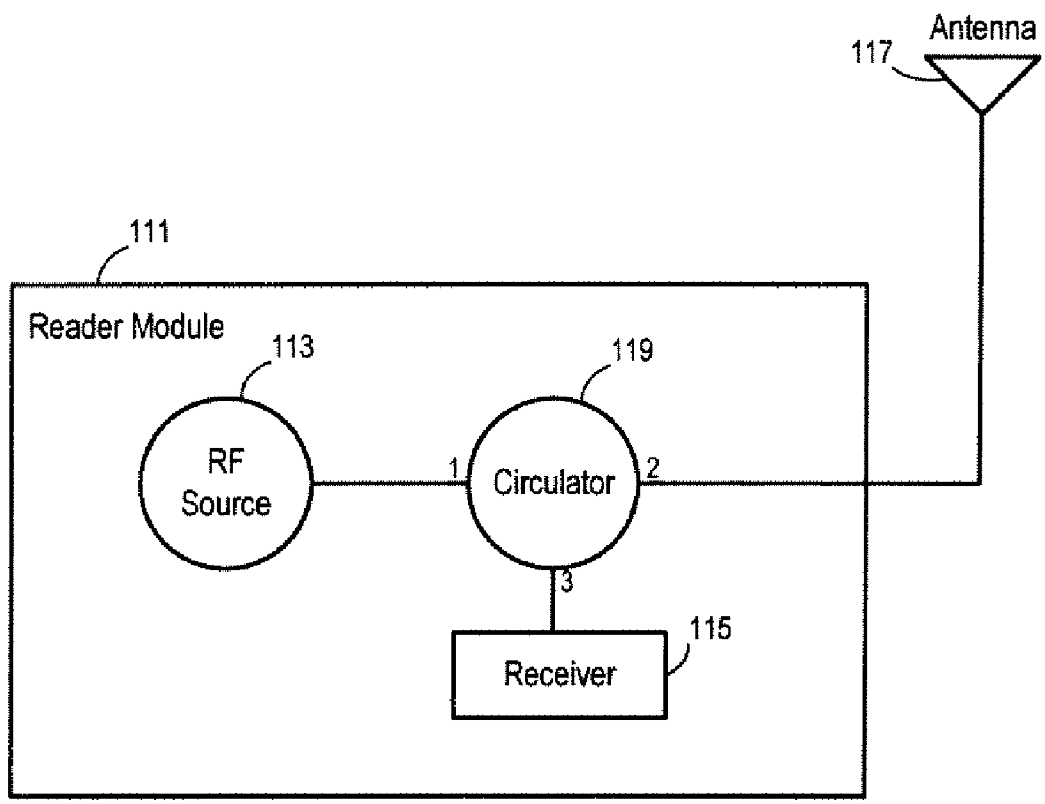

In FIG. 2, a reader module (201) contains a switch matrix (209) which can be used to selectively couple two or more non-collocated antennae (e.g., 211, 219, etc.) to the radio frequency (RF) source (203) for transmission and to the receiver (205) for reception in different combinations. For example, in one configuration, the switch matrix (209) connects antenna A (211) to the radio frequency source (203) for transmission, while connecting antenna W (219) to the receiver (205) for reception; in another configuration, the switch matrix (209) connects antenna W (219) to the radio frequency source (203) for transmission and antenna A (211) to the receiver (205) for reception. Note that the switch matrix may not necessarily have rows and columns. The term “switch matrix” is used to indicate that the switch matrix can couple multiple antennae to multiple devices (e.g., radio frequency source, receiver, etc.) in different combinations. In one embodiment, an antenna (e.g., 211 or 219) can be used either for transmission or for reception, but not for both transmission and reception at the same time; different antennae are used for transmission and reception at the same time. Optionally, the switch can further couple one antenna (e.g., 211 or 219) to both the RF source (203) and the receiver (205) in a further configuration to operate in a monostatic mode as in FIG. 1A or 1C.

In one embodiment, while one antenna (e.g., 211) is transmitting, one or more other antennae (e.g., 219, etc.) that are not collocated with the transmitting antenna (e.g., 211) are used for reception sequentially (or, alternatively, in parallel using multiple receivers). The switch matrix can then be operated to switch the roles of at least some of the antennae, such as switching a previously transmitting antenna to receive and a previously receiving antenna to transmit. For example, the antenna A (211) is switched from transmitting to receiving; and the antenna W (219) is switched from receiving to transmitting. For example, the switch matrix disconnects the antenna A (211) from the radio frequency source (203) and connects the antenna A (211) to the receiver (205), while disconnecting the antenna X (219) from the receiver (205) and connecting the antenna X (219) to the radio frequency source (203). Thus, at least two of the non-collocated antennae are used at the same time for transmission and reception in a bistatic manner, without predefining the roles of the antennae.

Since transmit and receive are at different locations, a low noise amplifier (LNA) or a low noise receiver can be used to increase sensitivity, as in the bistatic system.

In FIG. 2, each of the antennae (e.g., 211 or 219) looks like a monostatic design, which is capable of transmission and reception. In one embodiment, the antennae (e.g., 211 and 219) are used in a bistatic fashion so that transmission and reception are not performed at the same location. Alternatively, the switch matrix (209) may further couple one antenna (e.g., 211 or 219) to both the radio frequency (RF) source (203) and the receiver (205) simultaneously in a further configuration to operate in a monostatic fashion. For example, the antenna A (211) can be switched to one of: a bistatic transmission mode, a bistatic reception mode and a monostatic mode. In the reception mode, the antenna A (211) is not used for transmission. In the transmission mode, the antenna A (211) is not used for reception. In the monostatic mode, the antenna A (211) is used for both transmission and reception.

Note that the monostatic mode is optional and in one embodiment none of the antennae is to operate in a monostatic mode.

Figure 3A:
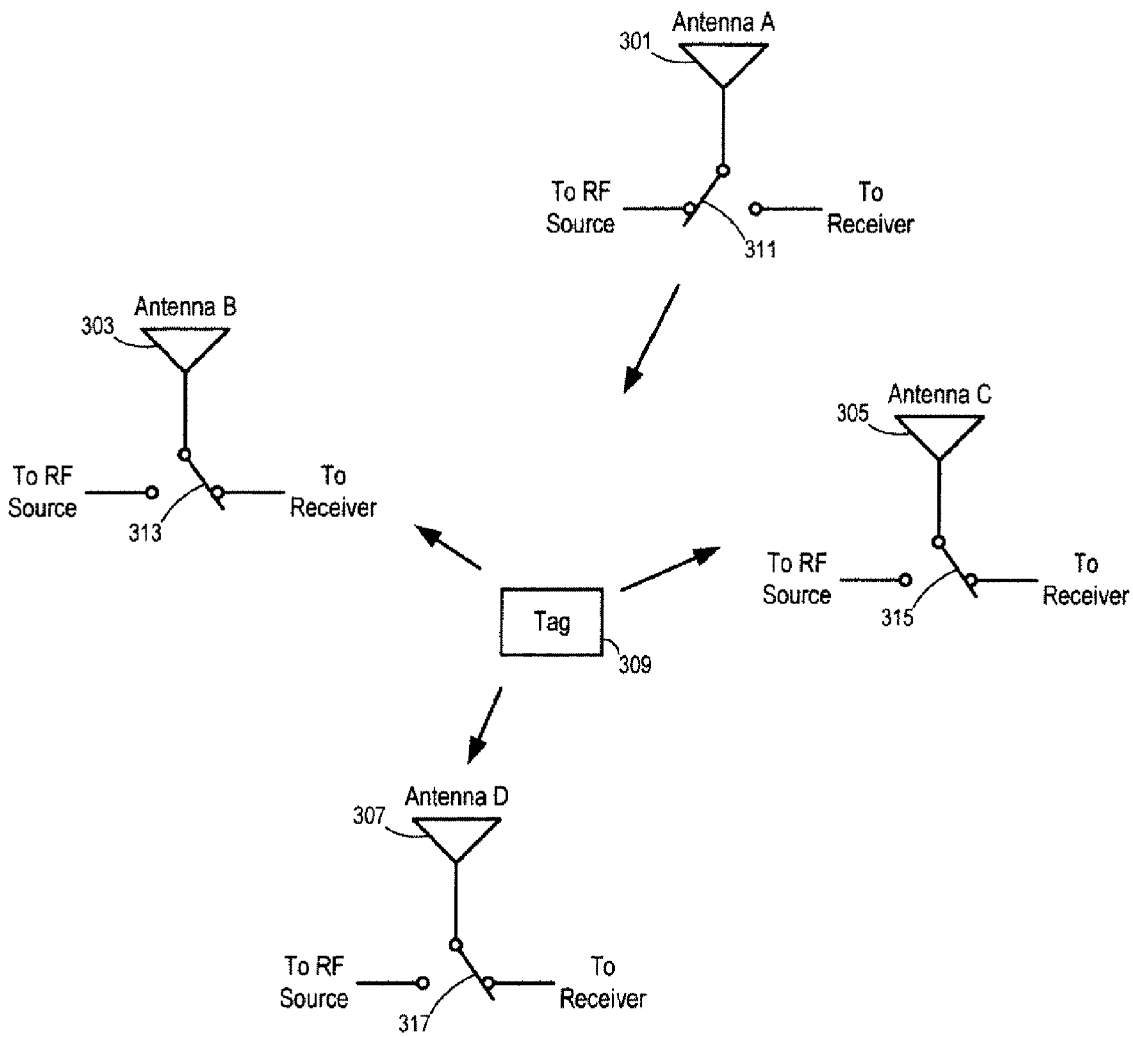
FIGS. 3A-3C illustrate different antenna configurations of an RFID reader system according to one embodiment of the present invention.
Figure 3B:
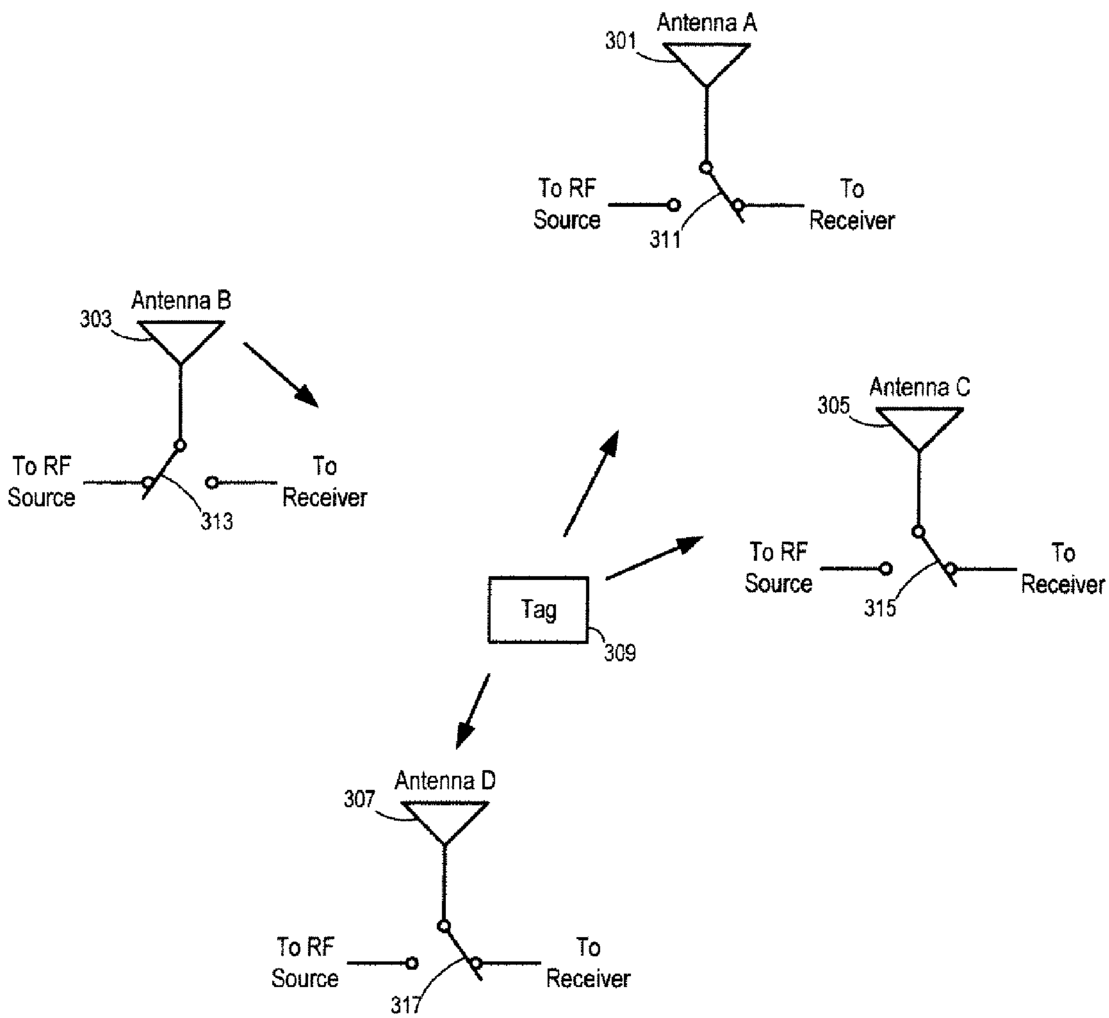
Figure 3C:
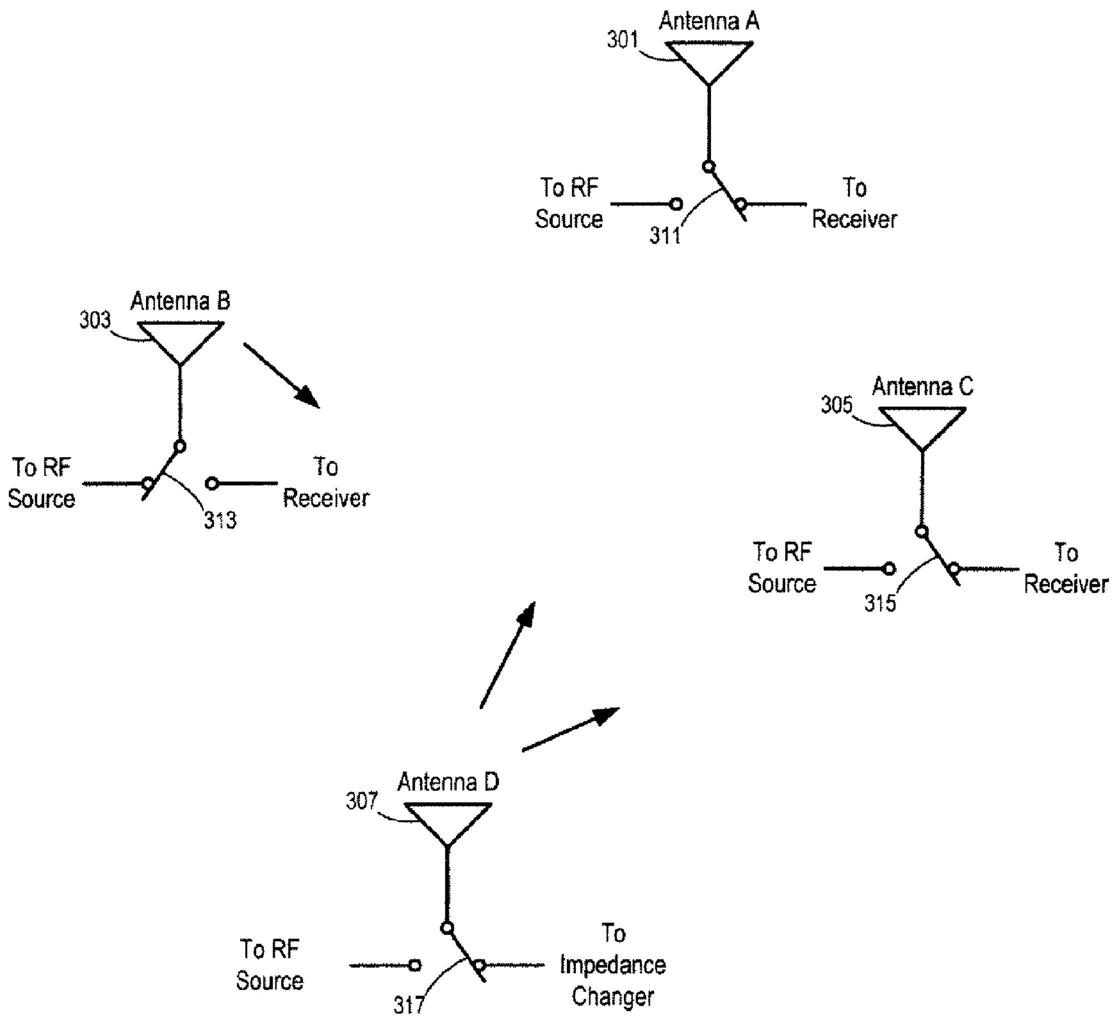

FIGS. 3A-3C illustrate different antenna configurations of an RFID reader system according to one embodiment of the present invention.

In FIGS. 3A-3C, a reader system has four non-collocated antennae, antennae A (301), antenna B (303), antenna C (305), antenna D (307). In general, more or less antennae may be used for either transmit or receive. In one embodiment, during the tag reading process, at least one of the antennae is used to transmit and power the tags, which backscatter the signals from the transmitting antenna to send signals to the reader, and at least one of the antennae is used at the same time to receive the signals from the tags.

In FIG. 3A, the antenna A (301) is switched to transmit; and antenna B, C and/or D (303-307) can be switched to form the receiving channel(s). For example, antenna B (303) may have the strongest tag signal (e.g., from tag 309) and be selected for the receiving channel.

In one embodiment, each antenna has a dedicated receiver so that antennae B, C and D (303-307) can be in the reception mode to receive tag signals in parallel.

Alternatively, the antennae may share one or more receivers. For example, the four antennae may share three receivers so that, when one antenna is in transmission, the other three can receive tag signals in parallel.

Alternatively, one receiver is shared among the antennae. The antennae (e.g., 303-307) are sequentially connected to the receiver one at a time to receive tag signals.

The antennae (301-307) may share one or more radio frequency sources. For example, a single radio frequency source may be selectively connected to one of the antennae for transmission. Alternatively, each antenna may have a dedicated radio frequency source, which can selectively power off to enter the reception mode.

In one embodiment, the antennae (301-307) are arranged so that a tag in an area can be detected through multiple pairs of the antennae. From the signal propagation delays, or from phase information contained in the backscatter signal from the tag, and the positions of the antennae, the location of a detected tag (e.g., 309) can be determined.

For example, using antennae B, C and D (303-307) to receive tag responses, the signal propagation delays on the paths, from the antenna A (301) to tag (309) and then to antennae B, C and D (303-307) respectively, can be determined. Alternatively, phase information in the backscatter signals on each of the separate receiving channels or antennas can be compared. The location of or distance to, the tag (e.g., 309) can be calculated from the signal propagation delays (e.g., from the signal propagation delay between different pairs of antennae), or from phase information contained in the backscatter signal from the tag.

In one embodiment, the length of the signal path is determined from the signal propagation delay from one antenna through the tag to another antenna. When the length of one signal path is known, the possible positions of the tag are limited to the surface of an ellipsoid that has the major axis centered on the line between the two antennae. The lengths of multiple signal paths between multiple pairs of antennae are used to determine the position of the tag. If the tag is known to be within an area of a particular plane, path lengths between two or more pairs of antennae can be sufficient to determine the location of the tag.

Using the switch matrix (311, 313, 315, 317), the system can be reconfigured to use the antenna B (303) for transmit and the antennae A (301), C (305) and/or D (307) for receive, as illustrated in FIG. 3B.

Further, in one embodiment, one of the antennae can be used to make a fake tag and to check receiver sensitivity (e.g., for self-test of the reader system), as illustrated in FIG. 3C.

For example, in FIG. 3C, while the antenna B (303) is transmitting and the antenna A (301) or C (305) is receiving, antenna D (307) can be switched in impedance to emulate a passive backscatter tag. For example, the switching of the antenna D (307) can be modulated to act like a tag. Since backscatter from a tag is typically a result of changing resonance to the signal from the reader, the transmission at the antenna D (307) can be easily modulated to emulate a tag. Through adjusting the impedance match for tag emulation (e.g., using an impedance changer coupled to the antenna), the reader system can perform a self-test to determine the reader sensitivity, etc. Alternatively, the antenna may be switched to actively transmit signals to emulate a tag.

In one embodiment, a portion of the antennae reflects tag emulating signals for reception by another portion of the antennae. For example, multiple antennae may reflect tag-emulating signals for reception by one antenna. Alternatively, one antenna may reflect tag-emulating signals for reception by multiple antennae.

In one embodiment, one reader uses one or more of its antennas to emulate tags and transmit information to another reader. For example, in one embodiment, reader A changes impedance of one of its antennas (e.g., antenna Ai) to backscatter the signals transmitted from reader B and send information from reader A to reader B; and reader A can later use the same antenna (e.g., antenna Ai) for transmission or reception, such as to read tags, or read information from another reader (e.g., reader B) that emulates a tag in a similar way. Thus, readers A and B can communicate with each other through emulating tags.

Alternatively, a tag circuitry can be implemented at each antenna for tag emulation and self-test. The switch matrix can further switch to couple the antennae to, or disconnect the antennae from, the tag circuitry.

Figure 4A:
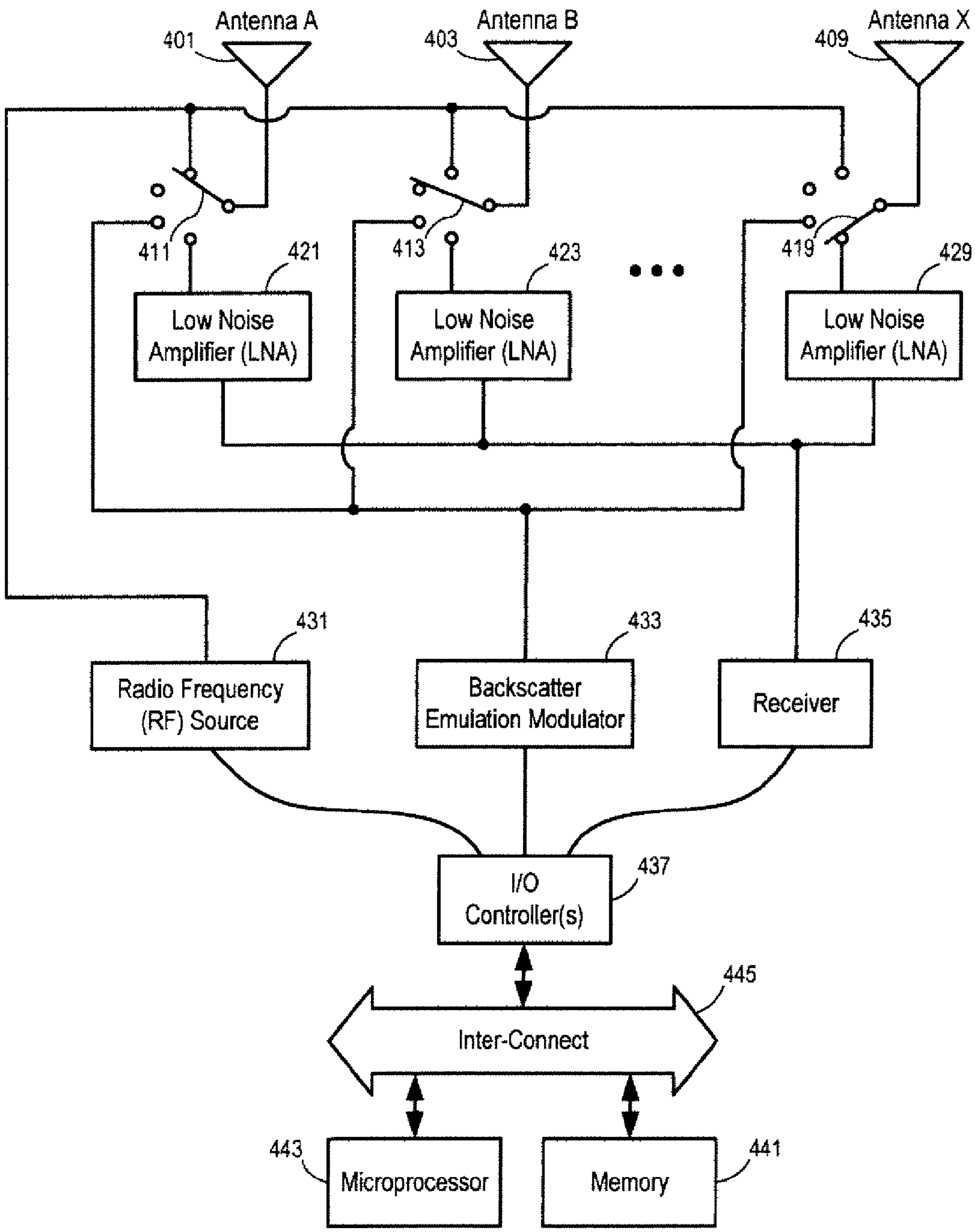
FIGS. 4A-4C illustrate switch matrices of RFID reader systems according to embodiments of the present invention.
Figure 4B:
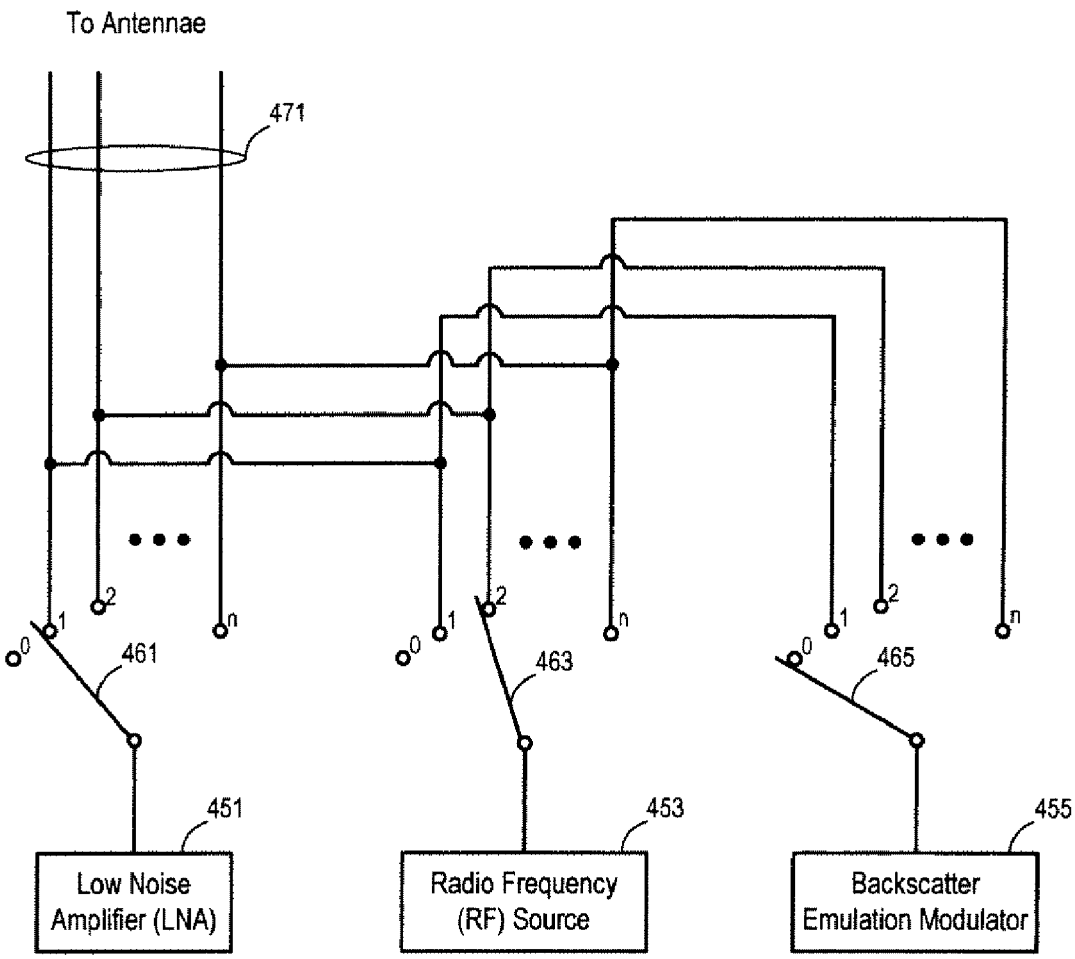
Figure 4C:
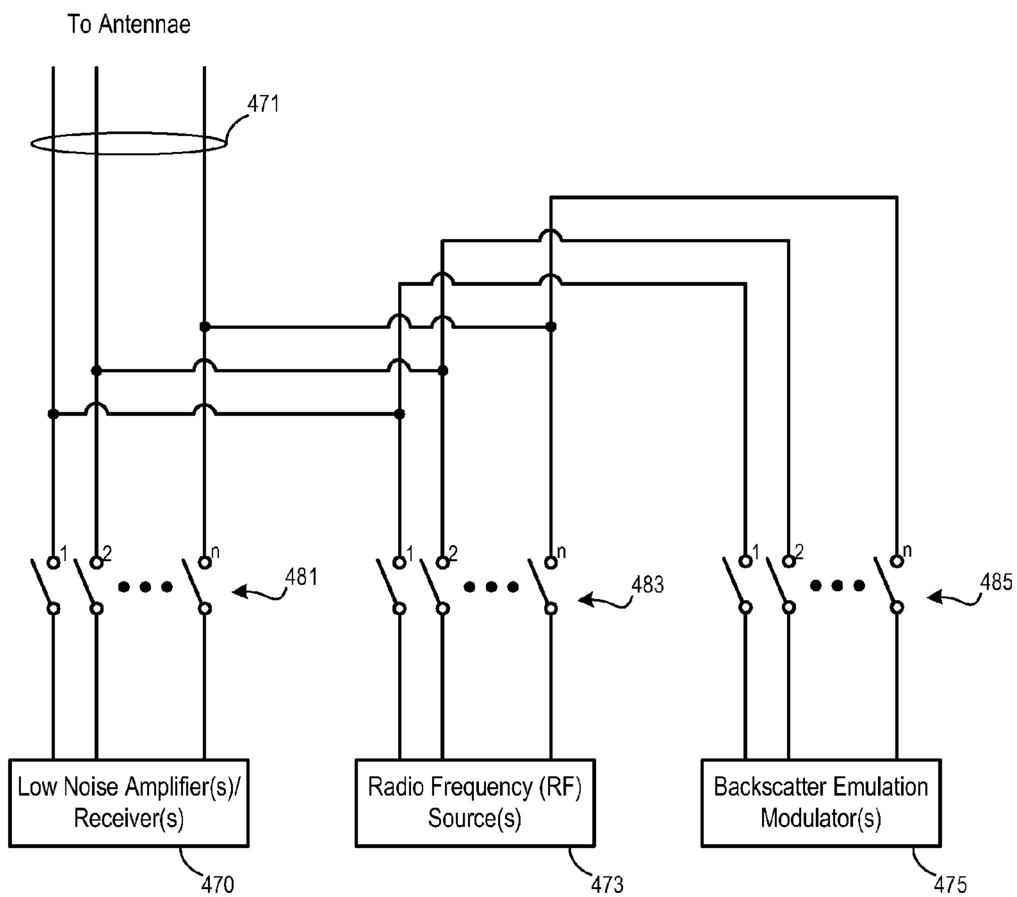

FIGS. 4A-4C illustrate switch matrices of RFID) reader systems according to embodiments of the present invention.

In FIG. 4A, a set of antennae (401, 403, . . . , 409) can be selectively connected to the radio frequency (RF) source (431), backscatter emulation modulator (433) and receiver (435). For improved results, the antennae (401, 403, . . . , 409) are not collocated.

In the example of FIG. 4A, the antennae (401, 403, . . . , 409) have corresponding low noise amplifiers (LNA) (421, 423, . . . , 429) that are located close to the corresponding antennae to increase reception sensitivity.

In one embodiment, the reader system of FIG. 4A includes an I/O (input/output) controller (437), which can be used to control the operation of the receiver (435), the radio frequency (RF) source (431), and the backscatter emulation modulator (433).

In one embodiment, the receiver (435) and the RF source (431) can be similar to the conventional receiver and RF source units found in traditional bistatic readers. The receiver and RF source typically operate, in North America, in a frequency range of about 900 megahertz, each coupled to the I/O controller(s) (437) which controls the reception of data from the receiver and the transmission of data, such as commands, from the RF source (431).

The I/O controller(s) is coupled to an inter-connect (445) which is in turn coupled to a microprocessor (443) and a memory (441). I/O controller(s) coordinates the operations of the receiver (435), the RF source (431) and the optional backscatter emulation modulator (433), according to the instructions from the microprocessor (443) and the memory (441). In one embodiment, the I/O controller(s) can further control the operations of the switches (411, 413, . . . 419), which forms a switch matrix to selectively couple the antennae (401, 403, . . . , 409) to the receiver (435), the RF source (431) and the backscatter emulation modulator (433). In general, at least one of the antennae (401, 403, . . . , 409) is used for transmission and at least another one of the antennae (401, 403, . . . , 409) is used for reception at the same time. In general, various different possible implementations may be used in the processing system represented by elements 437, 445, 443, and 441. For example, the receiver (435), the RF source (431) and the backscatter emulation modulator (433) may be directly controlled by a digital signal processor (DSP).

In one implementation, the microprocessor (443) is a programmable microcontroller, such as an 8051 microcontroller or other well-known microcontrollers, or microprocessors (e.g. a PowerPC microprocessor); and the memory (441) includes dynamic random access memory and a memory controller which controls the operation of the memory; memory (441) may also include a non-volatile read only memory for storing data and software programs. In another implementation the interconnect may connect a DSP for signal operation or decoding. The memory (441) typically contains a program which controls the operation of the microprocessor (443) and also contains data used during the processing of tags as in the interrogation of tags. In one embodiment, the memory (441) would typically include a computer program which causes the microprocessor (443) to send search commands through the I/O controller to the RF source and to receive responses from the tags through the receiver (435) and the I/O controller (437).

The reader system may also include a network interface, such as an Ethernet interface, which allows the reader to communicate to other processing systems through a network. The network interface would typically be coupled to the inter-connect (445) so that it can receive data from either the microprocessor (443) or from the memory (441).

In one embodiment, the operation of the switch matrix is under the control of the microprocessor (443), according to the instructions stored in the memory (441), through the I/O controller(s) (437).

In one embodiment, the switch matrix (e.g., 411, 413, . . . , 419) are located near the corresponding antennae. Alternatively, the switch matrix may be partially located near the corresponding antennae and partially located near the radio frequency (RF) source (431), and backscatter emulation modulator (433). For example, radio frequency (RF) source (431) may be selectively switched to ports that connect through cables to the corresponding antennae respectively. In another embodiment, the switch matrix itself is under the control of a DSP or microprocessor and may be used to switch between impedances to emulate a tag. Any switch in reality can change the impedance of the device to which it is attached depending upon state. In one embodiment, the state of the switch is changed in a tag like fashion to make an antenna look like a tag. The backscatter emulation modulator (433) may include tag circuitry for tag emulation. Alternatively, the backscatter emulation modulator (433) may include an impedance changer, which is controllable to modulate backscatter. Alternatively, the backscatter emulation modulator (433) may simply include an impedance to a receiver that is different from the impedance of another path to the receiver so that switching between the two paths using the switch matrix modulates backscatter.

Further, one or more low noise amplifiers/receivers may be located at a central location for sharing among multiple antennae; and the switch matrix may be located at the central location for connection to the set of antennae.

In one example, the reader system further includes a timing circuit for determining the signal propagation delay, or from phase information contained in the backscatter signal from the tag, from one antenna to the tag and then to another antenna. The microprocessor (443) then executes the instructions in the memory (441) to determine the location of the tag.

In FIG. 4B, the set of antennae are connected to low noise amplifier (LNA) (451), radio frequency (RF) source (453) and backscatter emulation modulator (455) through wires (471) and the switch matrix (461, 463, 465).

In the switch matrix of FIG. 4B, the antennae are connected to the receiver one at a time. However, other types of switches can be used to connect more than one antenna to receivers in parallel. Further, the switch matrix can be designed to avoid simultaneously connecting both the receiver and the radio frequency source to the same antenna. Alternatively, the switch matrix can include configurations where one or more of the antennae operate in a monostatic mode. Using the switches (461 and 463), a particular pair of antennae can be selected for bistatic reading operations. Different pairs of antennae can be sequentially selected for detection of tags (and for propagation delay determination, or for the determination of phase information contained in the backscatter signal).

In FIG. 4C, the set of antennae are connected to low noise amplifier(s)/receiver(s) (470), radio frequency (RF) source(s) (473) and backscatter emulation modulator(s) (475) through wires (471) and the switch matrix (481, 483, 485).

In the switch matrix of FIG. 4C, the antennae can be connected to the receiver(s) and the radio frequency (RF) source in any combination, in parallel or sequentially. In one embodiment, the operation of the switch matrix (481, 483, 485) is controlled by a microprocessor or microcontroller according to firmware or software.

Alternatively, the switch (483) may be rearranged to selectively power off corresponding sections of RF sources for reception. Similarly, the switch (485) may be rearranged to selectively reduce the backscatter emulation signals to close to zero.

In general, various types of switches can be used in different embodiments of the present invention. The switches allow selective delivery of reader transmission signals to an antenna for transmission in a particular configuration and substantially isolate the reader transmission signals from other antennae for reception to avoid cross talk and spill over in receiving channels. Switching circuits that can selectively attenuate the reader transmission signals toward the antennae without completely disconnecting the antennae can also be used.

Figure 5:
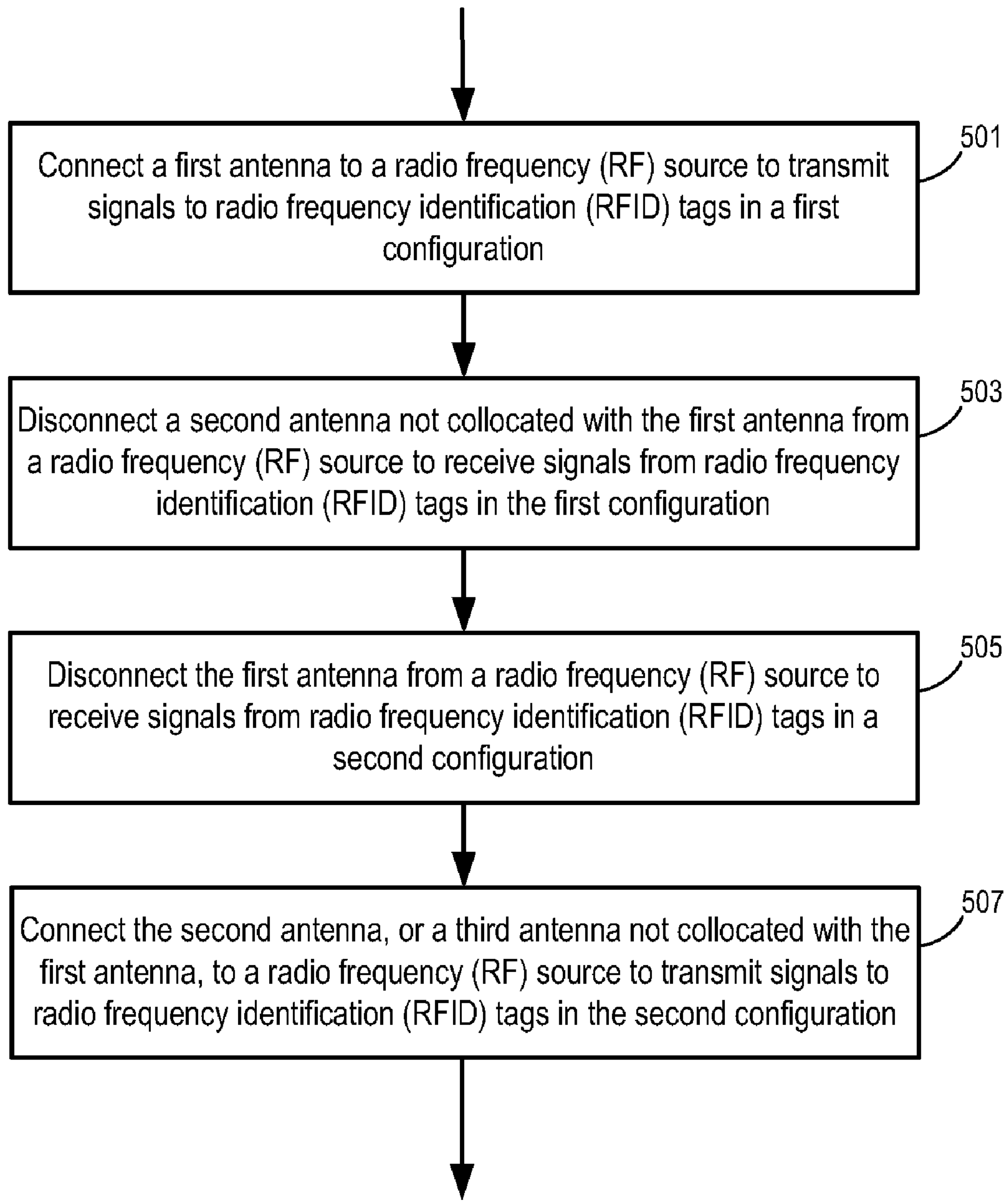
FIGS. 5-7 show flow diagrams for operation of RFID reader systems according to embodiments of the present invention.
Figure 6:
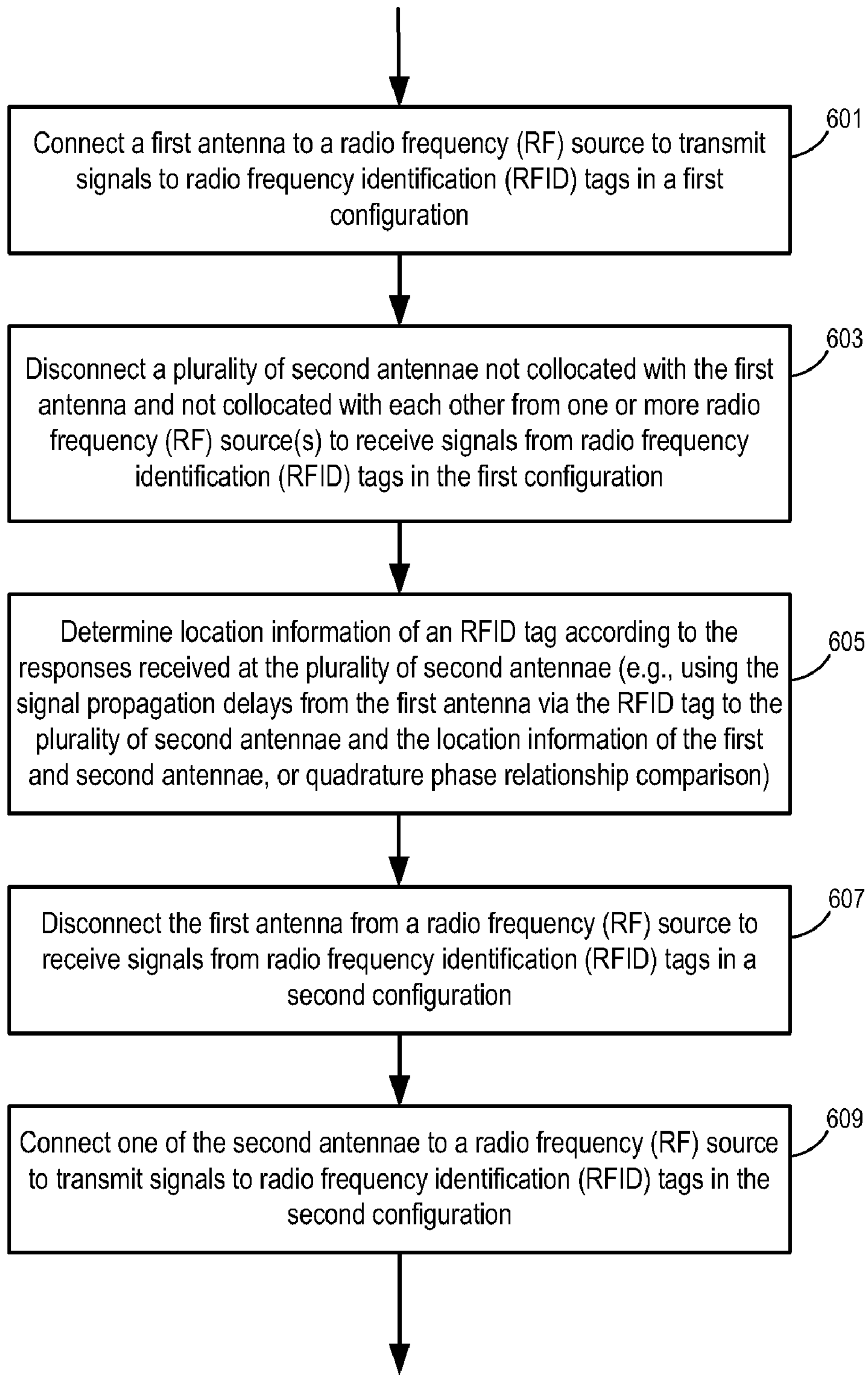
Figure 7:
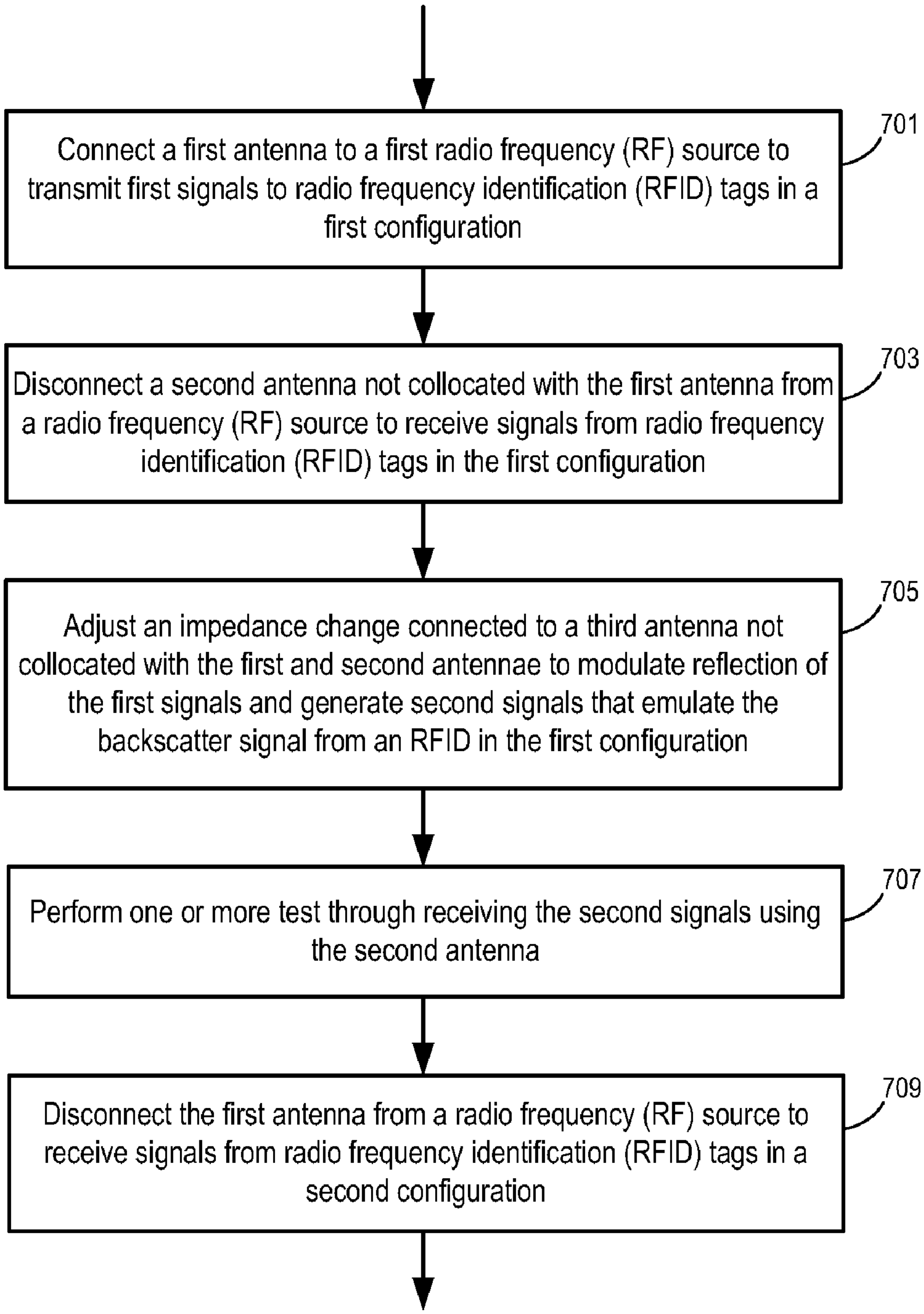

FIGS. 5-7 show flow diagrams for operation of RFID reader systems according to embodiments of the present invention.

In FIG. 5, operation 501 connects a first antenna to a radio frequency (RF) source to transmit signals to radio frequency identification (RFID) tags in a first configuration. Operation 503 disconnects a second antenna not collocated with the first antenna from a radio frequency (RF) source to receive signals from radio frequency identification (RFID) tags in the first configuration. Note that operations 501 and 503 may be performed in parallel, or sequentially in the order as shown in FIG. 5 or in a different order. In one embodiment of the first configuration, the first antenna transmits signals to tags while the second antenna receives passive, backscatter signals from the tags.

Operation 505 disconnects the first antenna from a radio frequency (RF) source to receive signals from radio frequency identification (RFID) tags in a second configuration. Operation 507 connects the second antenna, or a third antenna not collocated with the first antenna, to a radio frequency (RF) source to transmit signals to radio frequency identification (RFID) tags in the second configuration. Note that operations 505 and 507 may be performed in parallel, or sequentially in the order as shown in FIG. 5 or in a different order. In one embodiment of the second configuration, the second antenna, or the third antenna, transmits signals to tags while the first antenna receives passive, backscatter signals from the tags.

In FIG. 6, operation 601 connects a first antenna to a radio frequency (RF) source to transmit signals to radio frequency identification (RFID) tags in a first configuration. Operation 603 disconnects a plurality of second antennae not collocated with the first antenna and not collocated with each other from one or more radio frequency (RF) source(s) to receive signals from radio frequency identification (RFID) tags in the first configuration. Note that operations 601 and 603 may be performed in parallel, or sequentially in the order as shown in FIG. 6 or in a different order. In one embodiment of the first configuration, the first antenna transmits signals to tags while the plurality of second antennae receive passive, backscatter signals from the tags.

Operation 605 determines location information of an RFID tag according to the responses received at the plurality of second antennae (e.g., using the signal propagation delays from the first antenna via the RFID tag to the plurality of second antennae and the location information of the first and second antennae, or quadrature phase relationship comparison).

Operation 607 disconnects the first antenna from a radio frequency (RF) source to receive signals from radio frequency identification (RFID) tags in a second configuration. Operation 609 connects one of the second antennae to a radio frequency (RF) source to transmit signals to radio frequency identification (RFID) tags in the second configuration. Note that operations 607 and 609 may be performed in parallel, or sequentially in the order as shown in FIG. 6 or in a different order. In one embodiment of the second configuration, one of the second antennae transmits signals to tags while the first antenna receives passive, backscatter signals from the tags.

In general the location information of a tag can be determined using signal propagation delays, or from phase information contained in the backscatter signal from the tag, obtained from tag responses detected in different configurations of the switch matrix.

In FIG. 7, operation 701 connects a first antenna to a first radio frequency (RF) source to transmit first signals to radio frequency identification (RFID) tags in a first configuration. Operation 703 disconnects a second antenna not collocated with the first antenna from a radio frequency (RF) source to receive signals from radio frequency identification (RFID) tags in the first configuration. Note that operations 701 and 703 may be performed in parallel, or sequentially in the order as shown in FIG. 7 or in a different order. In one embodiment of the first configuration, the first antenna transmits signals to tags while the second antenna receives passive, backscatter signals from the tags.

Operation 705 adjusts an impedance change connected to a third antenna not collocated with the first and second antennae to modulate reflection of the first signals and generate second signals that emulate the backscatter signal from an RFID tag in the first configuration. Operation 707 performs one or more tests through receiving the second signals using the second antenna. In one embodiment, the third antenna is coupled to the same reader as the first and second antennae. Alternatively, the third antenna is coupled to a different reader; and the reader with the third antenna uses the backscatter signal to communicate information to the reader with the first and second antennae.

Operation 709 disconnects the first antenna from a radio frequency (RF) source to receive signals from radio frequency identification (RFID) tags in a second configuration. In one embodiment of the second configuration, the first antenna is used to receive tag signals or tag-emulating signals while another antenna that is coupled to the same reader of the first antenna transmits signals to the tags.

In general, self-test can be performed under different configurations where different antennae are used for transmission, tag emulation and reception.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A radio frequency identification (RFID) reader, comprising:

- a plurality of antennae;
- a radio frequency (RF) source for signal transmission;
- a receiver to receive backscattered modulated signals from at least one RFID tag; and
- a phase comparison circuit coupled with the receiver, wherein the phase comparison circuit is configured to compare relative phases of backscatter received from at least two of the plurality of antennae.

2. The RFID reader of claim 1, wherein the plurality of antennae are non-collocated antennae.

3. The RFID reader of claim 2, further comprising a processor coupled with the phase comparison circuit to determine location information of the at least one RFID tag from the comparison of relative phases of backscatter received from at least two of the plurality of antennae.

4. The RFID reader of claim 2, further comprising a processor coupled with the phase comparison circuit to determine distance information of the at least one RFID tag from the comparison of relative phases of backscatter received from at least two of the plurality of antennae.

5. The RFID reader of claim 2, further comprising a processor coupled with the phase comparison circuit to determine a length of the signal path of the at least one RFID tag from the comparison of relative phases of backscatter received from at least two of the plurality of antennae.

6. The RFID reader of claim 1, further comprising a low noise amplifier coupled with the receiver and one of the plurality of antennae for signal reception.

* * * * *